United States Patent [19]

Ogino et al.

[11] Patent Number: 4,765,386
[45] Date of Patent: Aug. 23, 1988

[54] PASSENGER CAR RADIAL TIRE HAVING EXCELLENT MOTION PERFORMANCES AND DURABILITY

[75] Inventors: Takao Ogino, Tokorozawa; Sumito Nakagawa, Kodaira, both of Japan

[73] Assignee: Bridgestone Corporation, Tokyo, Japan

[21] Appl. No.: 937,778

[22] Filed: Dec. 4, 1986

[30] Foreign Application Priority Data

Dec. 10, 1985 [JP] Japan .................. 60-275874

[51] Int. Cl.$^4$ .............................................. B60C 9/08
[52] U.S. Cl. ...................................... 152/556; 57/902; 152/560
[58] Field of Search ............... 152/451, 556, 558, 560, 152/458, 548, 561; 57/902, 200, 212

[56] References Cited

U.S. PATENT DOCUMENTS 4,657,058 4/1987 Kabe .......................... 152/556

FOREIGN PATENT DOCUMENTS 2096950 10/1982 United Kingdom .

*Primary Examiner*—Michael Ball
*Assistant Examiner*—Thomas Bokan
*Attorney, Agent, or Firm*—Sughrue, Mion, Zinn, Macpeak & Seas

[57] ABSTRACT

A radial tire for use in passenger cars is disclosed which is excellent in motion performance and durability. The tire has a carcass cord layer in which steel cords of a single strand construction represented by (1xn) in which n is a number of filament yarns and is an integer of from 1 to 5 are embedded in rubber. The thickness of the rubber between the adjacent steel cords is in a range between 0.80 and 2.00 mm when measured in a tire circumferential direction at a location having a tire maximum width in an arrangement of the steel cords in the carcass cord layer. A product (nxd$^4$) between a number (m) of the filament yarns constituting the steel cord of the single strand construction and a diameter (d) of the filaments is in a range of 0.002 to 0.012. The diameter of the filaments is in a range between $0.15 \leq d \leq 0.25$ mm.

3 Claims, 1 Drawing Sheet

FIG_1
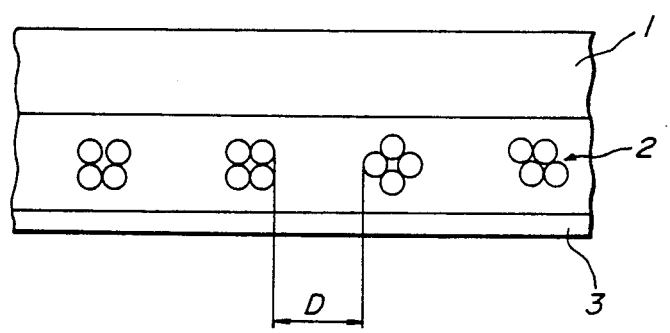

PASSENGER CAR RADIAL TIRE HAVING EXCELLENT MOTION PERFORMANCES AND DURABILITY

BACKGROUND OF THE INVENTION (1) Field of the Invention:

The present invention relates to a radial tire for use in passenger cars. More particularly, the invention relates to a passenger car radial tire in which by using steel cords instead of textile cords ordinarily used in a carcass cord layer, durability at tire side portions is increased, and cornering stability, riding comfortability against vibrations, and rolling resistance as motion performances important for the tires are all improved as compared with passenger car radial tires using textile cords.

(2) Prior Art Technique:

Steel cords are customarily used both in a belt cord layer and a carcass cord layer in the case of radial tires for use in trucks and buses. On the other hand, it is a common practice in the case of conventional passenger car radial tires that while the steel cords are used in the belt cord layer, textile cords of such as polyester, nylon, rayon, etc. which have an excellent fatigue resistance are used in the carcass cord layer. However, when these textile cords are used in the carcass cord layer of the passenger car radial tires, there were the following problems:

(1) Resistance to external scratches of the tire side portions formed by rubbing at curbs becomes insufficient.
(2) Since the textile cords generally have low bending and compression rigidity, there is a limit in increasing the rigidity of the tire side portions and obtaining higher motion performances.
(3) since strength becomes insufficient in the case of a relatively large scale passenger car radial tire, a plurality of carcass cord layers need to be used. This results in impeding the motion performance and making the process of tire making more complex.

On the other hand, when steel cords are used in the carcass cord layer of a radial tire for the passenger cars instead of the textile cords, the following problems are expected.

First, since the cords used in the carcass cord layer repeatedly undergo bending and compression deflection for a long period of time during rolling of the tire, material fatigue of the cords proceeds and tenacity of the cords lowers resulting from a fretting phenomenon due to filament yarns in the cords being rubbed with one another. When material fatigue and tenacity reduction become conspicuous, the tire side portions begin to break. For this reason, a technique is needed for improving fatigue resistance and fretting resistance of the steel cords to the extent that they can be used in the carcass cord layer of radial tires for the passenger cars.

Second, when steel cords having a larger bending rigidity than textile cords are use in the carcass cord layer, the rigidity of the tire side portion becomes too high. Thus, there is a problem that while cornering stability is increased, on the other hand, the riding comfortability against vibrations is largely deteriorated. In general, the improvement of cornering stability and the improvement of riding comfortability in the tire are antinomy with each other. In order to obtain the tires excellent in both of the motion performances, a technique is required to overcome this contradictory problem.

Under this background, it has been considered generally difficult to use the steel cords in the carcass cord layer of the passenger car radial tire due to the insufficient fatigue resistance and deterioration in a part of the motion performance, particularly, such as riding comfortability against vibrations.

As an example of conventional passenger car radial tires in which the steel cords are used in the carcass cord layer, is a pneumatic radial tire disclosed in Japanese patent application Laid-open No. 58-221,703. This tire is characterized by using metal cords of a $3\times3$ construction in which three strands each having three metal filaments twisted are twisted together and the diameter of the filaments is from 0.08 to 0.15 mm. This publication describes as its effects that side cut burst resistance, cornering stability and high speed durability can be attained.

However, it has been made clear by study and examination of the tires disclosed in the above laid-open publication that the following problems are included therein.

First, the $3\times3$ construction in the steel cord as one of the constituent requisites in this tire is a socalled strand construction. When the steel cords of this construction are used in a passenger car radial tire having a large deflection of the carcass cord layer and a large movement of the cords, not in a truck and bus radial tire for use under a high internal pressure, tenacity of the cords are largely decreased due to a fretting wear at point contacts among filament yarns and particularly among the strands during running. This renders the application of such steel cords to the passenger car radial tire infavorable. With respect to fatigue resistance, high stress is repeatedly and locally applied onto the surfaces of the filaments in the strand construction including the point contacts. Therefore, even when small diameter filaments having higher flexibility are used, there is a great fear that fatigue rupture occurs. Further, when the diameter of the filament yarn is in a range of 0.08 to 0.15 mm which is one of the constituent requirements, it is difficult to make the bending and compression rigidity of the cords themselves high, so that expected motion performance, can hardly be obtained.

SUMMARY OF THE INVENTION

Under consideration of the above circumstances, the present inventors have made repeated investigation through experimentally preparing various cords and tires. Consequently, they have confirmed that the abovementioned problems can be solved by a radial tire having a carcass cord layer in which steel cords having a specific single strand construction are embedded in rubber under specific conditions, and then accomplished the present invention.

According to the present invention, there is a provision of a radial tire for use in passenger cars and being excellent in motion performances and durability, said radial tire having a carcass cord layer in which steel cords of a single strand construction represented by $(1\times n)$ in which n is a number of filament yarns and is an integer from 1 to 5 are embedded in rubber, wherein a thickness of the rubber between the adjacent steel cords is in a range between 0.80 and 2.00 mm when measured in a tire circumferential direction at a location having a tire maximum width in an arrangement of the steel cords in said carcass cord layer; a product $(n\times d^4)$ between a number (n) of the filament yarns constituting the steel cord of the single strand construction and a fourth power of a diameter (d) of the filaments is in a range of $0.002 \leq n \times d^4 \leq 0.012$; and the diameter of the filaments is in a range between $0.15 \leq d \leq 0.25$ mm.

These and other objects, features and advantages of the present invention will be well appreciated upon reading of the following description of the invention when taken in conjunction with the attached drawing. It is understood that some modifications, variations and changes of the same could be easily made by one skilled in the art to which the invention pertains without departing from the spirit of the invention or the scope of claims appended hereto.

BRIEF DESCRIPTION OF THE DRAWINGS

For better understanding of the invention, reference is made to the attached drawing, wherein:

FIG. 1 is a partial sectional view of a side portion of an embodiment of the radial tire according to the present invention.

DETAILED DESCRIPTION OF THE INVENTION

The present inventors have acknowledged the fact during the above-mentioned investigation that in order to increase the durability of the steel cords used in the carcass cord layer of the radial tire, the point contacts which promote the fatigue rupture due to increase in the fretting wear and the local stress as occurring in the above-mentioned strand construction are required to be diminished, and a single strand construction represented by $1 \times n$ is most appropriately used. In the single strand construction, the contacting state between the filaments is a line contact, and a contact pressure is low. Further, improved twisting technique makes rubber impregnated among the filaments to prevent contacts thereamong and completely diminish the fretting. At the same time, there is a possibility of the fatigue rupture can be lowered to a large extent. It is a common practice that a strand construction or a layer construction having totally 10 or more filaments is used in a carcass cord layer of the truck and bus radial tire. Although the above-mentioned single strand construction is excellent in fretting fatigue resistance, such a single strand construction has not been used up to now because the cord tenacity, the cord rigidity, etc. can hardly reach required levels. On the other hand, it was made clear that the tenacity of the cords can be lowered in the case of the passenger car radial tires because low internal pressure is used, so that the single strand construction can be satisfactorily used.

It was found that the steel cords having high bending rigidity as the cord properties are best suited so as to accomplish the high motion performances, particularly to improve the cornering stability. That is, it is advantageous that a diameter of the filaments constituting the cord as well as a diameter of the cords are made as large as possible, so long as the fatigue resistance permits.

Further, from the standpoint of the improvement of the riding comfortability against vibrations and the rolling resistance for attaining the high motion performances, such can be further improved by decreasing the end count of the steel cords in the carcass cord layer, that is, by increasing the thickness of rubber between the cords.

Therefore, the passenger car radial tire having excellent motion performances and the durability of the present invention, the following are necessary;

(1) The cord layer in which the steel cords of the single strand construction represented by $1 \times n$ in which n is a number of the filament yarns, and is an integer of 1 through 5 are embedded in rubber is used as the carcass cord layer, so that satisfactory durability can be obtained by a single cord layer because the steel cords have high strength.

(2) The thickness (D), illustrated in FIG. 1 of the rubber between the embedded cords is in a range from 0.80 to 2.00 mm when measured in a tire circumferential direction at a tire maximum width location in an arrangement of the steel cords in the carcass cord layer. In FIG. 1, reference numerals 1, 2 and 3 denote a side rubber layer, a steel cord, and an inner liner layer, respectively.

(3) A product $(n \times d^4)$ in which n and d are the number of the filament yarns constituting the steel cord of the single strand construction and the diameter of the filaments, respectively, is in a range from 0.002 to 0.012.

(4) The diameter of the filament yarns constituting the steel cord of the single strand construction is in a range from 0.15 to 0.25 mm.

If the number of the filament yarns constituting the steel cord of the single strand construction is more than 5, although an ideal profile of the single strand construction may be maintained, a space inside the cords increases and gaps among the filaments is simultaneously narrow, so that penetration of rubber into the inside of cords is interrupted and corrosion resistance becomes lowered. Further, the ideal profile of the single strand construction is likely to be collapsed into a geometrically stable shape. For instance it collapses into a shape in which the yarn filaments are contained inside the cords. Consequently, the filaments falling inside the cords undergo a large contact stress from the surrounding filaments or the distribution of the tensile force upon the filaments becomes ununiform. As a result, there is a danger that fatigue resistance is deteriorated.

In addition, as mentioned above, with respect to the end count of the cords in the case where steel cords of the single strand construction are used in the carcass cord layer, the larger the thickness of rubber between the cords, the better the performance. However, if the thickness of rubber exceeds 2.0 mm, there arises a problem that unevenness at the side portion becomes conspicuous from the outside because the space between the cords is too wide. Further, there is an increased possibility that the cords come up to the inside surface of the tire through the inner linear layer during running over a long distance. On the other hand, if the space is less than 0.80 mm, the superiority of motion performance over the current textile cords lessens. In particular, if the space between the cords is too wide, there is a tendency that cornering stability becomes lowered when the bending rigidity of the cords is relatively low. In order to improve the three performances of the cornering stability, riding comfortability against vibrations and the rolling resistance in a well balance fashion, the thickness of the rubber between the cords is preferably in a range from 1.20 to 1.70 mm.

The reason why the product $(n \times d^4)$ between the number (n) of the filament yarns constituting the steel cord of the single strand construction and the fourth power of the diameter (d) of the filaments is specified to be in a range from 0.002 to 0.012 is that although $n \times d^4$ is a value relating to the bending rigidity of the cords, if it is less than 0.002, the expected cornering stability level cannot be obtained due to too low cord rigidity. On the other hand, if it is inversely more than 0.012, the diameter of the cords becomes too large, so that the covering rubber or the inner linear layer for the cords needs be thickened and thus such is infavorable for the application to the passenger car radial tires. When it is combined with the thickness of 1.20 to 1.70 mm in the thickness range of the rubber between the cords based upon consideration of the above-mentioned balanced performances, the value of $n \times d^4$ is preferably from 0.0035 to 0.009.

Further, the reason why the diameter (d) of the filament yarns constituting the steel cords of the $1 \times n$ single strand construction is set in a range from 0.15 to 0.25 mm is that if it is less than 0.15 mm, the twisted cord using these filament yarns is so soft that appropriate rigidity of the side portion cannot be obtained. This decreases the superiority of the cornering stability over the textile cord. If it is more than 0.25 mm, the surface strain of the filaments due to repeated bending of the side portion becomes greater and therefore fatigue rupture is feared. Thus, over 0.25 mm is not preferable.

As mentioned in the foregoing, the present invention has the effect that the motion performances which are important for the tires, particularly, the cornering stability, the riding comfortability against the vibration and the rolling resistance, can be improved and the durability of the tire side portion can be simultaneously increased to a large extent by using the single strand construction-steel cords composed of the steel filaments as yarns in the carcass cord layer of the passenger car radial tire and optimizing the construction of the steel cords and the diameter of the filament yarns as well as the thickness of rubber between the cords in the carcass cord layer.

The technique of the present invention can be applied not only to the general passenger car radial tires but also to low profile radial tires and high speed radial tires having high motion performance. In addition, the present invention can be applied to radial tires for use under a relatively low internal pressure besides the passenger car radial tires, for instance, tires for racing cars, agriculture cars, motor cycles, small size or medium size trucks, leisure vehicles, etc.

Next, the present invention will be explained in more detail with respect to examples and comparative examples. These examples are merely given in illustration of the invention, but should not be interpreted to limit the scope of the invention.

EXAMPLES 1 and 2, and COMPARATIVE EXAMPLES 1 and 2

Four kinds of tires each having a tire size of 185 SR 14 and a rim size of $5 \times 14$ were prepared as tires in Examples 1, 2 and Comparative Examples 1 and 2. As shown in Table 1, these tires had single strand constructions of $1 \times 3 \times 0.22$ and $1 \times 4 \times 0.20$ and strand constructions of $3 \times 3 \times 0.12$ and $4 \times 4 \times 0.10$ as the construction of cords of the carcass cord layer, respectively. Durability of these tires were evaluated according to the below-mentioned measuring method. Results obtained are also shown in Table 1.

Durability measuring method

After a test tire was run on a drum under the below-mentioned drum-running conditions, durability was evaluated based on a decreased percentage due to fretting relative to an initial stage cord tenacity. This percentage was measured by a tensile tester after the cords were extracted from the tire having run in the above, and the average value was determined when the number of times (n) of the measurements was twenty. Drum running conditions:
Load: JIS 150% loading,
Speed: 60 km/hr,
Internal pressure: 2.0 kg/cm$^2$,
Running conditions: 40,000 km

TABLE 1

|  | Example | | Comparative Example | |
| --- | --- | --- | --- | --- |
|  | 1 | 2 | 1 | 2 |
| Cord construction (End count)* | $1 \times 3 \times$ 0.22 (34 cords/ 50 mm) | $1 \times 4 \times$ 0.20 (29 cords/ 50 mm) | $3 \times 3 \times$ 0.12 (34 cords/ 50 mm) | $4 \times 4 \times$ 0.10 (29 cords/ 50 mm) |
| Percentage (%) relative to initial stage tenacity | 98.3 | 97.5 | 78.3 | 75.8 |

*End count shows value measured at a location where a tire has a maximum width.

As evident from Table 1, the tenacity is lowered by more than 20% in the strand costructions of $3 \times 3$ and $4 \times 4$, while almost no tenacity drop was observed and an extremely conspicuous effect was recognized in the single strand construction of the present invention. As mentioned above, when the steel cords of the single strand construction according to the present invention are used in the passenger car radial tire having the single carcass cord layer, the superiority in the durability as compared with the strand construction can be confirmed.

EXAMPLES 3 through 6 and COMPARATIVE EXAMPLES 3 through 6

Eight kinds of tires in Examples 3 through 6 and Comparative Examples 3 through 6 were experimentally prepared. These tires each had a carcass cord layer or carcass cord layers satisfying conditions shown in Table 2 and a tire size of 185 SR 14. Since two polyester cord layers are ordinarily used as the carcass cord layer in the tires having the above-mentioned size, a tire having such polyester cord layers was taken as a comparative tire in Comparative Example 3, and its motion performance were evaluated together with the other tires according to the below-mentioned method. Results obtained are shown in Table 2.

Motion performance evaluation

The cornering stability, the riding comfortability as the rolling resistance and the motion performance are measured according to JIS D 0202, and indicated by an index while each evaluated value of the tire in Comparative Example 3 being taken as 100. The larger the index, the more excellent the performances.

TABLE 2

| No. | Comparative Example | | | | Example | | | |
| --- | --- | --- | --- | --- | --- | --- | --- | --- |
|  | 3 | 4 | 5 | 6 | 3 | 4 | 5 | 6 |
| Cord kind | Polyester (1000D/2) | 3 × 3 × 0.12 | 1 × 5 × 0.13 | 1 × 3 × 0.15 | 1 × 5 × 0.175 | 1 × 4 × 0.20 | 1 × 3 × 0.22 | 1 × 2 × 0.25 |
| Carcass cord layer (End count/50 mm) | 2P (42) | 1P (32) | 1P (32) | 1P (33) | 1P (26.5) | 1P (26.5) | 1P (26.5) | 1P (28) |
| Filament diameter (d mm) | — | 0.12 | 0.13 | 0.15 | 0.175 | 0.20 | 0.22 | 0.25 |
| $n \times d^4$ | — | 0.0018 | 0.0014 | 0.0015 | 0.0047 | 0.0064 | 0.0070 | 0.0078 |
| Thickness of rubber between cords (mm) | 0.60 | 1.00 | 1.20 | 1.20 | 1.40 | 1.40 | 1.40 | 1.40 |
| Motion performances |  |  |  |  |  |  |  |  |
| Cornering stability | 100 | 96 | 95 | 97 | 104 | 106 | 107 | 108 |
| Riding comfortability against vibrations | 100 | 99 | 101 | 101 | 107 | 108 | 108 | 108 |
| Rolling resistance | 100 | 97 | 98 | 100 | 104 | 105 | 105 | 106 |

It is shown in Table 2 that as compared with the tires in Comparative Examples 4 to 6 in which both of or either one of the diameter (d) of the filaments and the product ($n \times d^4$) between the number (n) of the filament yarns and the fourth power of the diameter (d) of the filament falls outside of the respective ranges specified in the present invention, the above-mentioned three motion performances in the tires of Examples 3 to 6 are improved by 4 to 8% than those of the tire in Comparative Example 3 using polyester cords. Thus, it was recognized that the motion performances in the case where the steel cords of the single strand construction are applied to the carcass cord layer are clearly superior.

EXAMPLES 7 to 9 and COMPARATIVE EXAMPLES 7 and 8

Five kinds of tires each having the same tire size were experimentally prepared as Examples 7 to 9 and Comparative Examples 7 and 8 while the thickness of the rubber between cords were varied by changing the end count of the cords in the carcass cord structure of 1×4×0.20 in the tire of Example 4. The motion performance of the tires were measured according to the same test measuring methods as in Example 4, and results were indicated in Table 3 by index while each of evaluation values in the tire of Comparative Example 3 was taken as 100. The cord end count and the thickness of rubber between the cords are values measured at a location having the tire maximum width.

As shown in Table 3, although cornering stability is almost unchanged by decreasing the cord end count and increasing the thickness of the rubber between the cords, the riding comfortability against vibration and the rolling resistance tend to be improved. Extremely excellent motion performances can be attained in the range from 0.80 to 2.00 mm specified in the present invention.

What is claimed is:

1. A radial tire for use in passenger cars and being excellent in motion performances and durability, said radial tire having a carcass cord layer in which steel cords of a single strand construction represented by (1×n) in which n is a number of filament yarns and is an integer from 1 to 5 are embedded in rubber, wherein a thickness of the rubber between the adjacent steel cords is in a range between 0.80 and 2.00 mm when measured in a tire circumferential direction at a location having a tire maximum width in an arrangement of the steel cords in said carcass cord layer; a product ($n \times d^4$) between a number (n) of the filament yarns constituting the steel cord of the single strand construction and a fourth power of a diameter (d) of the filaments in mm is in a range of $0.002 \leq n \times d^4 \leq 0.012$; and the diameter of the filaments is in a range between $0.15 \leq d \leq 0.25$ mm.

2. A radial tire according to claim 1, wherein the thickness of rubber, between the adjacent cords is in a range from 1.20 mm to 1.70 mm.

3. A radial tire according to claim 2, wherein the product $n \times d^4$ is in a range between 0.0035 mm and 0.009 mm$^4$.

TABLE 3

| No. | Comparative Example | | | Example | | | |
| --- | --- | --- | --- | --- | --- | --- | --- |
|  | 3 | 7 | 8 | 7 | 8 | 4 | 9 |
| Cord kind | Polyester (1000D/2) | 1 × 4 × 0.20 | 1 × 4 × 0.20 | 1 × 4 × 0.20 | 1 × 4 × 0.20 | 1 × 4 × 0.20 | 1 × 4 × 0.20 |
| Carcass cord layer (End count/50 mm) | 2P (42.0) | 1P (51.0) | 1P (42.4) | 1P (36.2) | 1P (31.6) | 1P (26.6) | 1P (21.9) |
| Thickness of rubber between cords (mm) | 0.60 | 0.50 | 0.70 | 0.90 | 1.10 | 1.40 | 1.80 |
| Motion performances |  |  |  |  |  |  |  |
| Cornering stability | 100 | 108 | 107 | 107 | 107 | 106 | 105 |
| Riding comfortability against vibrations | 100 | 100 | 102 | 104 | 105 | 108 | 108 |
| Rolling resistance | 100 | 99 | 101 | 104 | 105 | 105 | 107 |

* * * * *